United States Patent [19]

Yuan et al.

[11] Patent Number: 5,685,900

[45] Date of Patent: Nov. 11, 1997

[54] METHOD FOR BENEFICIATING DISCOLORED KAOLIN TO PRODUCE HIGH BRIGHTNESS COATING CLAY

[75] Inventors: Jun Yuan, Milledgeville; Ben E. Everett, Tennile; Windell R. Andrews, Sandersville, all of Ga.

[73] Assignee: ECC International Inc., Roswell, Ga.

[21] Appl. No.: 546,398

[22] Filed: Oct. 18, 1995

[51] Int. Cl.⁶ .......................... B03D 3/06; C04B 33/04; C04B 33/10
[52] U.S. Cl. .......................... 106/487; 106/488; 501/148; 252/187.26; 252/186.21; 209/5; 209/10; 209/39; 423/118.1
[58] Field of Search .......................... 106/486, 487, 106/488; 252/186.21, 187.26; 209/5, 10, 39; 501/146, 148; 423/118.1

[56] References Cited

U.S. PATENT DOCUMENTS

| | | |
|---|---|---|
| 3,477,809 | 11/1969 | Bundy et al. . |
| 3,586,523 | 6/1971 | Fanselow et al. . |
| 3,627,678 | 12/1971 | Marston et al. . |
| 3,701,417 | 10/1972 | Mercade . |
| 3,808,021 | 4/1974 | Maynard . |
| 3,837,482 | 9/1974 | Sheridan, III . |
| 3,857,781 | 12/1974 | Maynard . |
| 4,227,920 | 10/1980 | Chapman et al. . |
| 4,381,948 | 5/1983 | McConnell et al. . |
| 4,604,369 | 8/1986 | Shi . |
| 4,618,374 | 10/1986 | Thompson, III .......................... 106/486 |
| 4,650,521 | 3/1987 | Koppelman et al. .......................... 106/486 |
| 5,358,120 | 10/1994 | Gantt et al. .......................... 106/486 |
| 5,397,754 | 3/1995 | Lannicelli et al. .......................... 106/486 |
| 5,454,865 | 10/1995 | Ginn et al. .......................... 106/486 |

FOREIGN PATENT DOCUMENTS 2059811  4/1981  United Kingdom .

*Primary Examiner*—Michael Marcheschi
*Attorney, Agent, or Firm*—Suzanne Kikel

[57] ABSTRACT

A method for beneficiating a low brightness fine particle size discolored kaolin crude to produce a high brightness coating clay. By combining the two beneficiating techniques of selective flocculation and ozonation, a synergistic phenomena occurs and a clay product of superior brightness and whiteness can be obtained from fine discolored clays that cannot be achieved by beneficiation with either process singularly. By passing the flocced clay through ozonation, the flocculant polymer left in the clay can be completely destroyed.

16 Claims, No Drawings

METHOD FOR BENEFICIATING DISCOLORED KAOLIN TO PRODUCE HIGH BRIGHTNESS COATING CLAY

BACKGROUND OF THE INVENTION

This invention relates to the beneficiation of kaolin clays and clay minerals and, more particularly, is concerned with a method of removing a substantial portion of the titanium minerals and organics contained as impurities in fine particle size kaolin clays to produce a clay, suitable for coating paper, having markedly greater brightness and whiter color.

Kaolin clay coating pigments having very fine particle size and high brightness characteristics are widely utilized in the coating of merchant grade papers and various types of paperboard, wherein high gloss and smoothness of coating are required. Typically, these pigments are applied as a high solids aqueous suspension, i.e., a suspension including from approximately 60 to 75% by weight of clay solids. The size distribution of prior art pigments used for such purposes are usually such that of the order of 90 to 100% by weight thereof are of less than 2 micrometers equivalent spherical diameter (E.S.D.). Typically, further, the brightness characteristics (as measured by the standard specification established by Tappi procedure T-646 OS-75, are of the order of at least 90 on the so called G.E. scale. Among the further qualities of high solids coating clay slurries which are of paramount importance for achieving high quality coatings, are the viscosity characteristics of same. It may be noted in this connection that the term "viscosity", as used herein with respect to clay slurries, refers to such characteristics as determined by the procedures of Tappi method T 648su-72, as revised in 1972. This method sets forth specific procedures for determination of both the "low shear" and "high shear" viscosity. The latter, i.e. the high shear viscosity is considered of special importance in evaluating a high solids clay slurry for the aforementioned coating purposes.

Certain coating kaolins of the aforementioned type are particularly sought after for use in coating premium papers and paperboard. A product of this type is the ALPHAFINE® product of the present assignee, ECC International, Inc. This product is a high brightness, very fine particle size glossing clay, especially developed to meet the demands of the premium coated paper and paperboard producers. Such product provides the important combination of high sheet gloss and superior print quality required by these paper grades. The product can be effectively formulated into both air-knife and blade coating colors to achieve maximum board gloss. Typical physical properties of a product of the ALPHAFINE® type include a G.E. brightness of 90.5 and a particle size distribution such that at least 86% by weight of the particles have an E.S.D. of less than 0.5 micrometers. At a slurry solids content of 70%, the slurry will exhibit a Brookfield viscosity of about 300 cps at 20 rpm.

In a typical procedure for preparing a prior art premium coating day of the ALPHAFINE® type, a crude kaolin including cream Georgia kaolins in possible combination with grey crudes, is blunged and dispersed at high solids; degritted, and then scalped, diluted to 35–70% solids and classified to yield a fraction at about 90% less than 0.5 micrometers. This fraction is typically then subjected to oxidative bleaching, as with ozone, in order to bleach organic discolorants as may be present. The slurry is then subjected to a high intensity magnetic separation, and the recovered beneficiated clay is then, as is conventional, flocced and bleached with a reductive bleaching agent. The recovered material is filtered and then dispersed and dried as, for example, in a spray dryer or evaporator to yield the final output product.

However, natural occurring kaolin clays vary considerably in their color properties, even when produced from mines in the same locality or even from different sites in the same mine. The color of clays is largely due to discoloring contaminants, for example, titanium and iron minerals, organic and inorganic carbon, and impurity clay minerals such as smectite and illite-smectite mixed-layered clay mineral. Titanium and iron minerals and iron in the crystal structure of kaolinite and impurity clay minerals are largely responsible for the yellow brown shade. Organic and inorganic carbon is the main cause of the gray tint. Most of the natural occurring clays are discolored to a degree where no process available to the art could sufficiently improve their brightness and whiteness values to a level that would make them acceptable as a usable pigment or filter, particularly in the paper industry, even though some of them are within desired limits in other physical properties such as the viscosity of clay-water slurries and particle size distribution.

Many techniques have been developed in the recent years for removing impurities to improve clay products brightness. Among them are those which involve selective mining, magnetic separation, flotation, ozone oxidation, selective flocculation, and leaching. However, even with the many techniques for beneficiating clays which have been advanced over the years, there remains a very substantial portion of the clays available for mining which are not sufficiently beneficiated by such processes to achieve products of acceptable quality to the paper industry. This is particularly true with respect to so called "hard kaolins" from seconday kaolin clay deposits found in the Southeast, particularly in central and eastern Georgia.

Hard grey kaolin clays are well recognized in the kaolin art as having attributes which lend them to certain processing to yield very valuable products. These type of discolored kaolins are, for example, especially used to produce calcined filler pigments of high quality. Extensive discussions of hard grey kaolins may be found in McConnell, et al., U.S. Pat. No. 4,381,948 and in Fanselow, et al., U.S. Pat. No. 3,586, 523. The said clays are noteworthy for having a very fine particle size, but also are found in general to include high quantities of discoloring contaminants, including ferruginous impurities, and titaniferous impurities, i.e. titanium dioxide, which, in the iron-stained form in which it is present, produces discoloration in the said clays. Additionally, such clays in part derive their discoloration from sizable quantities of organic discolorants in addition to other common impurities. Certain aspects of the morphology of these clays would suggest that they might be useful for preparing very high quality coating clays as, for example, of the ALPHAFINE® type. However, previous efforts to do so have not been successful in yielding a product having both the desired brightness characteristics, as well as the low viscosity characteristics which are essential in such a high quality coating clay.

Previously, a process called "selective flocculation" has been used to try to upgrade Georgia "hard kaolin" to high brightness coating clay. Two fundamentally different approaches are known for clay beneficiation by selective flocculation: (1) The impurities are flocculated and the clay product is left in suspension; (2) the clay is flocculated and the impurities are left in supernatant suspension.

The first approach is less economical and therefore less desirable because a low recovery rate results from the simultaneous settlement of both clay and impurities and because of ineffectiveness with gray clays. Examples of this first approach disclosed in U.S. Pat. Nos. 3,701,417, 3,857,781, and 4,604,369.

The second approach is more desirable as a clay beneficiation process. Because clay particles are naturally charged on their surfaces, it is much easier and more effective to flocculate the clay particles rather than the impurity titanium minerals. The flocculated clay is also higher in solids concentration, which is more advantageous than the first approach where the clay product suspension is diluted after selective flocculation. Examples of this second approach are presented in U.S. Pat. Nos. 3,477,809 3,808,021, 3,837,482, 4,227,920, and U.K. Pat. No. 2,059,811. However, this second approach has been until now impractical, due primarily to the resultant contamination of the clay product by the presence of the flocculating reagent, which lowers the product brightness and is significantly deleterious to the product rheology.

Pursuant to the foregoing, it may be regarded as an object of the present invention, to provide a novel, practical, and effective process for removing the discolored titanium and organic impurities in low brightness, fine particle size discolored kaolin crude to produce a high brightness and whiteness coating clay which displays excellent viscosity for paper coating applications and which contains a minimum amount of undesirable residual chemicals.

A further object of the invention, is to provide a process of the foregoing character which is especially useful in processing a crude which comprises a hard grey kaolin.

SUMMARY OF THE INVENTION

Now, in accordance with the present invention, a method is disclosed for beneficiating a low brightness fine particle size discolored kaolin crude to produce a high brightness coating clay. Unexpectedly it has been found that by combining the two beneficiating techniques of selective flocculation and ozonation, a synergistic phenomena occurs and a clay product of superior brightness and whiteness can be obtained from fine discolored clays that cannot be achieved by beneficiation with either process singularly. By passing the flocced clay through ozonation, the flocculant polymer left in the clay can be completely destroyed. Pursuant to the invention, a dispersed aqueous slurry is prepared from a fine particle size discolored crude kaolin typically having a water-washed G.E. brightness in the range of 75 to 85, a contaminant titania content of from 0.5 to 3.0 weight percent, a contaminant iron content of from 0 to 2% expressed as $Fe_2O_3$, and a P.S.D. such that at least 85% by weight of the particles are of less than 2 micrometers E.S.D. The slurry is classified to recover a kaolin fraction wherein at least 90% by weight of the particles are of less than 0.5 μm E.S.D. This recovered fraction is subjected as a slurry to a first oxidative bleaching to partially bleach organic discolorants and to facilitate a subsequent step of selective flocculation of the clay. The slurry from the first oxidative bleaching step is then selectively flocculated utilizing a high molecular weight anionic polyacrylamide or a copolymer of a polyacrylate and a polyacrylamide, to form a supernatant phase which is highly concentrated with said contaminant titania, and a flocced clay phase which is relatively devoid of titania, but which includes the bulk of remaining discolorant organics. The flocs are then treated in aqueous suspension with gaseous ozone to destroy the flocculent polymer, thereby restoring the kaolin to a dispersed phase while further oxidizing the remaining discoloring organics. The ozonized kaolin is recovered and further beneficiated to provide the high brightness coating clay.

The crude utilized in the invention may comprise partially or entirely a hard grey kaolin which includes from 0.03 to 0.15% discoloring organics. The ozonation treatment can be carried out using gas contact apparatus including conventional bubbling apparatus or the like. The treatment level is typically at a dosage of 1.5–6 pounds ozone per ton of kaolin.

The product resulting from practice of the invention will have a brightness of at least 91 and displays a Hercules viscosity of less than 18 dynes at 2200 rpm when prepared as a 70% solids coating slurry. The product pigment in other instances may have a brightness of at least 93.

In some instances in practice of the invention, further brightness improvements can be achieved by incorporating a high shear mixing step prior to selective flocculation. A rotor and stator device such as a COWLES® mixer is suitable for this purpose. The shearing step can be conducted between the first oxidative bleaching and the selective flocculation, and may immediately proceed the flocculation step.

Typically, the first oxidative bleaching step in the process is at least partially effected with sodium hypochlorite. The process of the invention can be carried out as a batch operation; or can be conducted continuously by use of a thickener apparatus so that the overflow is impurity supernatant, and the underflow is flocced clay. A high capacity unit such as the well-known ENVIRO-CLEAN® thickener can be used for these purposes. Other thickeners which may be so employed are discussed at pages 573ff of the "Encyclopedia of Chemical Technology".

DESCRIPTION OF THE PREFERRED EMBODIMENTS

Pursuant to the invention, the crude kaolin serving as the feed can typically comprise a hard grey crude of the type aforementioned, although other discolored kaolins can also be used. The grey crude typically has a G.E. brightness in the range of from about 75 to 85 and includes contaminant titania from about 0.5 up to 3.0% by weight of kaolin. Contaminant iron is also present, ranging up to about 2% expressed as $Fe_2O_3$. The particle size distribution of the crude is such that at least 85% by weight of the particles are of less than 2 micrometers E.S.D. This crude is blunged and dispersed at about 70% solids (more generally it can be prepared as 30 to 70% solids). Sodium carbonate and sodium hexametaphosphate can be used as dispersing agents. The resultant slurry is degritted as, for example, by being passed through a 20 mesh to 80 mesh screen. The slurry is then scalped, diluted to 35 to 40% solids, and classified in centrifuges to produce a fraction at about 90% less than 0.5 micron. Typically, at least 90% by weight of the particles are of less then 0.5 micrometers. This slurry is then subjected to an initial oxidative bleaching step preferably using sodium hypochlorite. The dosage of the hypochlorite is in the range of 0.5 to 3 gallons per ton of dry clay. The bleached slurry is typically aged overnight, i.e. for about 12 hours to 24 hours.

The resulting slurry is thereupon diluted to about 5 to 25% solids, typically around 10 to 12% solids, and is then subjected to a selective flocculation treatment. The preferred selective flocculation reagents comprise a high molecular weight anionic polyacrylamide or a copolymer of a polyacrylate and polyacrylamide. A preferred flocculating agent is the CALGON™ R50 polymer which is a weakly anionic copolymer of polyacrylate and polyacrylamide, available from Calgon Corporation of Pittsburgh, Pa. Concentrations of the flocculating polymer or copolymer will generally be in the range of 0.01% to 0.1%, (or 0.3 to 5 lbs/ton dry clay), with about 2 pounds per ton dry clay being typical. It may be noted here that the first oxidative bleaching step which proceeds selective flocculation not only bleaches sizable proportions of the organic discolorants, but has a synergistic effect in facilitating formation of the flocs during the subsequent selective flocculation.

As a result of the selective flocculation, a supernatant phase forms which is highly concentrated in the contaminant titania. This supernatant phase is separated, and discarded or otherwise used. The purified flocs or sediment are preferably passed at about 30% solids through a high shear pump which break up the flocs, whereupon they are subjected as an aqueous suspension to ozonation at a dosage level of 1.5–6 pounds, typically about 2 pounds per ton of kaolin of the ozone. The ozone is preferably applied as a stream of bubbles which can be passed upwardly through the slurry. This can be a batch process, but preferably is a continuous process in which the ozone bubbles pass counter current to a flow of the slurry in a pipe or other conduit, such as mixed and packed column.

The ozone acts not only to destroy substantial portions of the remaining discoloring organics, but of equal importance, acts to destroy by oxidation the flocculent, i.e. the polymer which has been previously added. In consequence, the clay in the slurry is now in a dispersed phase and may be readily subjected to further beneficiation depending upon the contaminants. The slurry at about 30% solids or other dilute condition is thus typically passed through a high intensity magnetic separator, using apparatus of the type described in U.S. Pat. No. 3,627,678. The beneficiated material emerging from the magnetic separation may then be subjected, as is known in the art, to conventional flocculation and reductive bleaching as, for example, by addition of sulfuric acid with sodium hydrosulfite and aluminum sulphate. The recovered and bleached material can then be dried, as by filtering on a rotary vacuum filter or the like, after which the material can be reslurried, dispersed, and then dried by spray drying or by an evaporator.

The resulting material is found to be an excellent coating kaolin pigment having a brightness of at least 91 and preferably of at least 93. It displays a Hercules viscosity of less than 18 dynes of 4400 rpm when prepared as a 70% solids coating slurry.

The invention is further illustrated by the following Example:

EXAMPLE 1

The starting crude for this Example was a fine hard grey kaolin from a mine near Wrens, Ga. This crude was processed by two methods. First, by the method described in the background of this invention as being used for producing conventional ALPHAFINE®; and second, by means of the process of the invention. The initial crude was characterized by having a brightness of 84.6, a $TiO_2$ content of 2.03% and an iron content of 0.87% expressed as $Fe_2O_3$. The conventionally processed material was found to have a brightness of 91.2, a titania content of 1.47%, and an iron content of 0.76%. The sample processed by the method of the invention was found to have a much higher brightness of 93.3, a much lower titania content of 0.47% and a virtually similar iron content of 0.77%. Thus, the process of the invention was found with the same material to produce an improvement in brightness of 2.1 points, which is extremely significant in the pertinent art.

The process of the invention is particularly significant in terms of maintaining the rheological properties of the starting material. Previous art of the similar-type selective flocculation process has always resulted in a product with poor theology due to the residual contaminating flocculent, or the process could yield a product with comparable theology, but is economically unfeasible. This advantage of the present invention is illustrated in Table A by a comparison between a conventionally processed product (processed as for conventional ALPHAFINE®—see Example 1) and a sample processed in accordance with the invention—see Example 1. It would be noted that viscosity of the product of the invention is only slightly higher at low shear rate, and not much different at high shear rate.

TABLE A

| Rheology: | Brookfield cps @ 20 rpm | Hercules dynes @ 4400 rpm |
| --- | --- | --- |
| Sample #1 | | |
| Conventionally Processed Product | 460 | 4.8 |
| Product of Invention | 530 | 6.7 |
| Sample #2 | | |
| Conventionally Processed Product | 220 | 4.1 |
| Product of Invention | 340 | 3.8 |

Although the present invention has been particularly set forth in terms of specific embodiments thereof, it will be understood in view of the instant disclosure, that numerous variations upon the invention are now enabled to those skilled in the art, which variations yet reside within the scope of the invention. Accordingly, the invention is to be broadly construed, and limited only by the scope and spirit of the claims now appended hereto.

What is claimed is:

1. A method for beneficiating a low brightness, fine particle size discolored kaolin crude to produce a high brightness coating clay having a brightness of a least 89, comprising the steps of:

preparing a dispersed aqueous slurry from a fine particle size discolored crude kaolin having a solids content, a water washed G.E. brightness in the range of 75 to 85, a contaminant titania content of from 0.5 to 3.0%, a contaminant iron content of from 0 to 2%, expressed as $Fe_2O_3$, and a P.S.D. such that at least 85% by weight of the particles are of less than 2 μm E.S.D.;

classifying said slurry to recover a kaolin fraction wherein at least 90% by weight of the particles are of less than 0.5 μm E.S.D.;

subjecting said recovered fraction as a slurry to a first oxidative bleaching to partially bleach organic discolorants, and to facilitate subsequent flocculation of the clay;

selectively flocculating the solids of the slurry from said first oxidative bleaching step with a high molecular weight anionic polyacrylamide or a copolymer of polyacrylate and polyacrylamide, to form a supernatant phase which is concentrated with said contaminant titania, and a flocced clay phase having a reduced titania content, but which includes the remaining discolorant organics;

treating the flocs in aqueous suspension with gaseous ozone to destroy the flocculent polymer thereby restoring the kaolin to a dispersed phase, while further oxidizing the discoloring organics; and recovering and further beneficiating the ozonized kaolin to provide said high brightness coating clay.

2. A method in accordance with claim 1, wherein said crude comprises a hard grey kaolin which includes from 0.03 to 0.15% discoloring organics.

3. A method in accordance with claim 1, wherein the said flocs in aqueous suspension are treated with said ozone in an amount of at least 1.5–6 lbs/ton of kaolin.

4. A method in accordance with claim 2, wherein said solids content is from 30 to 70 weight %.

5. A method in accordance with claim 4, wherein said slurry is classified at about 35 to 40% solids, and the recovered fraction is subjected to said first oxidative bleaching at about 30 to 35% solids.

6. A method in accordance with claim 1, wherein said first oxidative bleaching step is accomplished with sodium hypochlorite.

7. A method in accordance with claim 1, wherein said bleached slurry is subjected to selective flocculation at about 5 to 25% solids.

8. A method in accordance with claim 7, wherein said bleached slurry is subjected to selective flocculation at about 10 to 12% solids.

9. A method in accordance with claim 1, wherein said ozonized kaolin is further beneficiated by being subjected in aqueous suspension to intense magnetic separation.

10. A method in accordance with claim 9, wherein said kaolin clay is recovered from said magnetic separation, reductive bleached to remove ferruginous impurities, and is then filtered and dried.

11. A method in accordance with claim 1, wherein said coating clay has a brightness of at least 91, and displays a Hercules viscosity of less than 18 dynes at 4400 r.p.m. when prepared as a 70% solids coating slurry.

12. A method in accordance with claim 11, wherein said coating clay has a brightness of at least 93.

13. A method in accordance with claim 1, which is carried out as a continuous process.

14. A method in accordance with claim 1, which is carried out as a batch process.

15. A method in accordance with claim 1, which is carried out with an additional step of high shear mixing before selective flocculation.

16. A method in accordance with claim 1, wherein following said first oxidative bleaching, the slurry is aged prior to selective flocculation.

* * * * *